Nov. 28, 1950
T. C. HILL
2,531,511
FOUR-WAY, SLIDE, SELECTOR VALVE
Filed Sept. 27, 1946
2 Sheets-Sheet 1
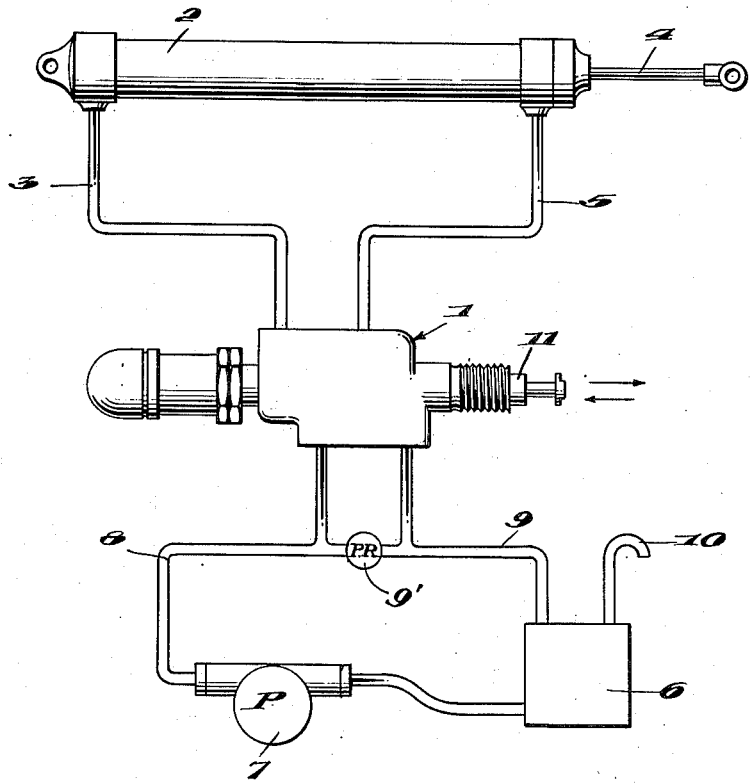
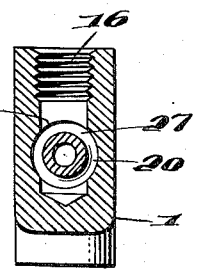
Inventor
THOMAS C. HILL,
By Donald W. Farrington
Attorney Nov. 28, 1950 — T. C. HILL — 2,531,511
FOUR-WAY, SLIDE, SELECTOR VALVE
Filed Sept. 27, 1946 — 2 Sheets-Sheet 2

Inventor
THOMAS C. HILL,
By Donald W. Farrington
Attorney

Patented Nov. 28, 1950

2,531,511

UNITED STATES PATENT OFFICE 2,531,511

FOUR-WAY, SLIDE, SELECTOR VALVE

Thomas C. Hill, Baltimore, Md., assignor to The Glenn L. Martin Company, Middle River, Md., a corporation of Maryland Application September 27, 1946, Serial No. 699,838

2 Claims. (Cl. 121—46.5)

This invention relates to a selector valve for use in a hydraulic system in which a double acting hydraulic cylinder is employed. A selector valve is one so constructed and arranged that when it is inserted in a hydraulic system, the pressure supply line from the pump to the cylinder and the return line to the reservoir pass through the valve. The valve can control the flow of high pressure fluid to either end of the double acting cylinder and at the same time control the flow of fluid from the low pressure end of the cylinder to the reservoir.

For smooth operation of the hydraulic system, the valve should include structure for metering the flow of fluid through the ports upon opening and closing of the valve. The valve should have structure to provide for proper pressure balance for ease of operation of the valve itself. To insure no lag in the hydraulic system, the ports in the valve should be adequate for the flow of fluid necessary to operate the hydraulic cylinder. As in most high pressure systems, the valve is made fluid-tight by resilient elastic gaskets or seals. It is most desirable to arrange the seals in the valve to render the valve fluid-tight with a minimum of stress on the seals, that is, prevent leakage or seepage externally of the valve, without subjecting the seals to the stress of the high pressure fluid.

In some hydraulic systems employing selector valves, if internal leakage or seepage should develop, the high pressure fluid will escape to either line connected to the double acting hydraulic cylinder and cause the cylinder strut to creep. This inadvertent motion of the cylinder strut, due to internal leakage, may cause serious malfunction of the apparatus to which the hydraulic cylinder is attached. Such a hydraulic cylinder is commonly used to extend and retract moving parts on an airplane. For example, the passenger ramps on commercial airplanes are so extended from the fuselage, and the flaps also are extended by such cylinders to positions of high lift and high drag. It can readily be seen that creepage of the cylinder, due to internal leakage in the valve, could have serious effects if such components were extended in flight.

An object of this invention is the provision of a selector valve that provides the proper pressure balance to insure ease of operation of the valve.

Another object of this invention is the provision of simple structure that provides for double porting and metered flow within the valves without the use of complicated auxiliary ports and passages.

Another object of this invention is the provision of a selector valve that will have no resilient gasket or seals subjected to high pressure fluid.

Another object of this invention is the provision of a selector valve structure in which internal leakage cannot cause creepage of the hydraulic cylinders in the equipment that it is intended to control.

Another object of this invention is the provision of a selector valve in which the return low pressure passages are arranged adjacent the outside walls so that the seals are subjected to low pressure fluid only.

A further object of this invention is the arrangement of passages in a selector valve so that any leakage or seepage of fluid from the high pressure path through the valve will flow directly into the return path through the valve and prevent the accumulation of high pressure fluid leakage.

Further and other objects will become apparent from the description of the accompanying drawings which form a part of this disclosure and in which like numerals refer to like parts.

In the drawings:

Figure 1 is a typical installation showing the use of the four-way selector valve.

Figure 4 is a section taken on the line 4—4 of Figure 2.

Figure 2:
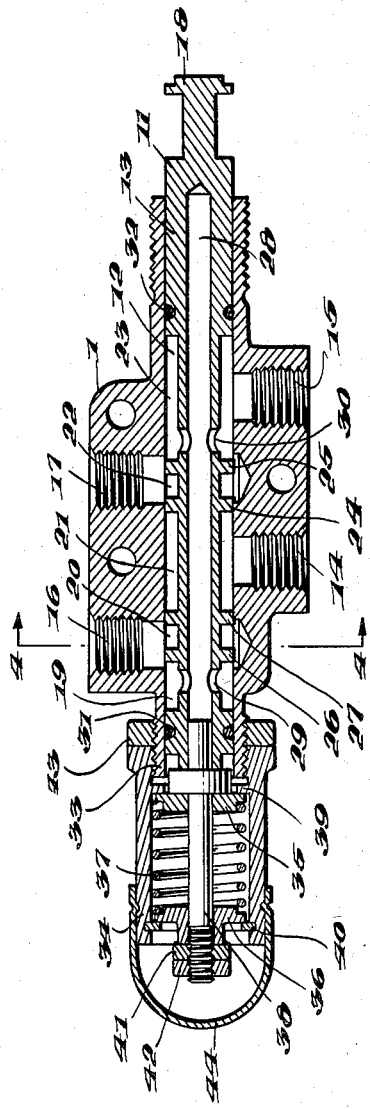
Figure 2 is a sectional view taken on the line 2—2 of Figure 3.
Figure 3:
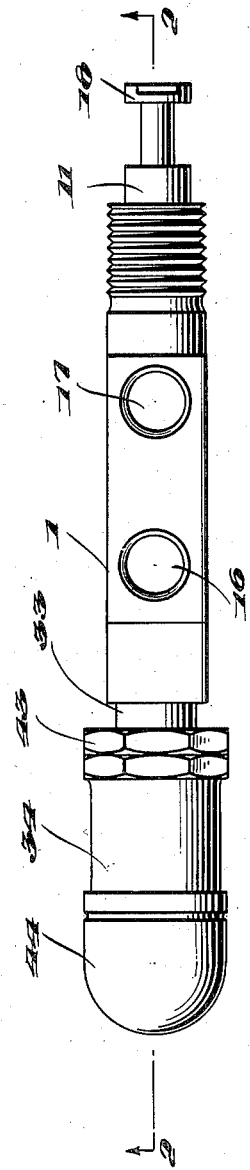
Figure 3 is a plan view of the valve.

The valve generally indicated as 1 in Figure 1 is a four-way selector valve that directs fluid under pressure to either side of the piston in the conventional double acting hydraulic cylinder, generally indicated as 2. Fluid pressure in line 3 will cause the strut 4 of the hydraulic cylinder to be extended and fluid pressure in line 5 will cause the strut to be retracted within the cylinder. When line 3 acts as a pressure line to conduct hydraulic fluid to cylinder 2, line 5 acts as a return line. Hydraulic fluid is stored in reservoir 6. Pump 7 is any conventional high pressure hydraulic pump that delivers fluid to line 8 at a relatively high pressure. In the system in which this selector valve is intended to be used, by high pressure is meant a normal hydraulic pressure of about 1500 lbs. per sq. inch. Line 8 serves as a high pressure line delivering hydraulic fluid to the selector valve. Line 9 acts as a return line from the valve to the reservoir. A vent 10 to the atmosphere maintains the reservoir, and therefore line 9, under substantially atmospheric pressure conditions. A conventional pressure relief valve 9' is connected between lines 8 and 9 to provide a by-pass for the pump when the valve is in its neutral position. When valve stem 11 is moved to the right or to the left, the fluid pressure from line 8 will be caused to enter lines 3 or 5, thus causing the strut 4 of hydraulic cylinder 2 to move to either the right or to the left. Upon motion of the piston in the hydraulic cylinder, either lines 3 or 5 will act as a return line for fluid from the cylinder which will be passed through the valve to return line 9 and the reservoir. By reason of vent 10, the return system from the cylinder through the valve, return line 9 and the reservoir are practically at atmospheric pressure.

As described above, valve 1 is a four-way selector valve incorporating structure to provide for the following salient features, namely: pressure balance within the valve, double porting and metered flow, and an arrangement of fluid pressure seals that are never subjected to the high pressure fluid flowing through the valve, but only to the return line pressure for all conditions of operations. Furthermore, any high pressure fluid due to leakage or seepage within the valve will flow into the passages through the valve that are open to the return line and therefore pressure cannot accumulate to affect the seals.

Valve 1 consists of a housing having a bore 12 therethrough, into which slide valve 13 is placed. Port 14 communicates with bore 12 and affords a connection for the high pressure line 8. Port 15 is in communication with bore 12 and affords a connection for return line 9. Ports 16 and 17 act as connections for pressure and return lines alternatively from the valve to the hydraulic cylinder. The end 18 of valve 13 is adapted to be connected to an actuating mechanism. Valve 13 is formed from a rod or cylinder of substantially the same diameter as bore 12. It is undercut at 19, 20, 21, 22 and 23 to provide annular passages for fluid between adjacent ports and also to provide flanges 24, 25, 26 and 27. These flanges are so spaced along the valve that flanges 24 and 27 extend between ports 16 and 17 so that in the neutral position of the valve no fluid will flow through either ports 16 or 17. Flanges 25 and 26 are so spaced relative to flanges 24 and 27 and the width of ports 16 and 17 that they will close communication between either port 16 or 17 and the return system when the valve is moved to the right or to the left to permit the passage of high pressure fluid to ports 16 and 17. Flanges 25 and 26 are so spaced that ports 16 and 17 are in communication with the return system when the valve is in the neutral position. Passage 28 is formed through the center of valve 13 and ports 29 and 30 afford communication between the undercut portions of the valve and passage 28. Through these ports and passages it will be seen that when the valve is in the neutral position, ports 16 and 17 are in communication with the return port 15. The function of flanges 24, 25, 26 and 27 are therefore to limit the high pressure to the chamber formed by the undercut portion 21 when the valve is in the neutral position and to prevent communication between either ports 16 and 17 and the return system when the valve is moved to direct the flow of fluid under pressure to either of the ports. Seals 31 and 32 are located on valve 13 outwardly of the chambers formed by undercut portions 19 and 23. Therefore, these seals are never required to seal against fluid pressure except the small amount of residual pressure in the return line system. The flanges engage the walls of the bore with a sliding but relatively fluid-tight fit. If leakage or seepage of fluid should take place past flanges 24 or 27, the fluid seepage or leakage will be in the return line system and a pressure cannot be developed in chambers 19 or 23 to which seals 31 and 32 might be subjected.

Figure 4 is a section through port 16 and is typical of ports 16 and 17. It will be noted that port 16 is formed by drilling a hole in valve 1 that extends through bore 12 and into the valve housing on the opposite side of bore 12. The intersections of hole 16 and bore 12 form two ports. That is, due to the undercut portion 20 of valve 13, fluid communication is afforded between both intersections of hole 16 and bore 12 which effectively amounts to double porting for the flow of fluid past flange 27. The intersection of the two cylindrical openings, coupled with the action of flange 27, affords two metered flow apertures for the fluid past flange 27. That is, the flange is opened slightly upon initial motion and the subsequent flow through the port depends upon the metering action of the port. Due to the bore of port 16 extending on each side of bore 12 affording double porting, double metering of the flow is also effected. By this same structure, a pressure balance for the valve is achieved, that is, due to the annular passage 20 around the valve and the porting of the valve in two diametrically opposite places, the valve is not subjected to an unbalance in pressure, but rather achieves a pressure balance which contributes to the smooth operation of the valve.

The spacing of flanges 24 and 25 is determined from the width of port 17. These flanges are equivalent in function to one flange equal to the axial length of the two flanges because the outer edge of each flange is the important operative portion of this structure. Having the undercut portion 22 form the two flanges, however, serves two additional important purposes, first, weight reduction is effected by removing excess metal which is very important in aircraft applications, and second, cutting down the area in contact with the wall of bore 12 of the two flanges to a minimum, facilitates making a lapped fit of the valve in the bore for fluid pressure sealing.

The threaded sleeve 33 on the valve housing supports a member 34 in which is located the self-centering mechanism for valve 13. Housing 34 has retaining washers 35 and 36 between which extends compression spring 37. Washers 35 and 36 slide on shaft 38 which is secured in the end of valve 13 in passage 28. Compression spring 37 will tend to hold washers 35 and 36 against stops 39 and 40. Nuts 41 and 42 locate the assembly of washers 35 and 36 between stops 39 and 40. It will be seen that if the valve is moved to the left, washer 35 will compress spring 37 which will tend to return washer 35 to a position against stop 39. Motion of the valve to the right will cause spring 37 to be compressed by washer 36 which will be returned to the left by the spring to seat against stop 40. This self-centering device housed in member 34 causes the valve to be returned axially to a predetermined position. By adjusting the axial position of member 34 on sleeve 33, the neutral position of the valve 13 may be adjusted relative to ports 16 and 17. Lock nut 43 maintains the adjustment of the neutral position of the valve. Member 44 affords a protective cover for the self-centering mechanism.

The operation of the valve can be readily followed on Figures 1 and 2. Fluid under pressure will enter port 14 and fill chamber 21. If leakage or seepage takes place past flanges 24 or 27, the fluid pressure will be dissipated because the portion of the system into which it leaks is at all times connected to the return line through port 15. If the valve is moved to the right, fluid pressure will flow from chamber 21 through port 17 and line 5 to retract strut 4 in cylinder 2. Before flange 24 will permit fluid to pass from chamber 21 to port 17, flange 25 will have closed communication between port 17 and chamber 23. By this same motion, spring 37 will have been compressed by washer 36. When the displacing force on valve 13 is removed, spring 37 will return washer 36 and valve 13 to a predetermined neutral position. The return path for the fluid in the cylinder will be provided through line 3, port 16, chamber 19, port 29, passage 28, port 30, port 15 and line 9. Similar pressure and return lines will be provided when the valve is displaced to the left for the reverse action of the hydraulic cylinder.

It is to be understood that certain changes, alterations, modifications and substitutions can be made without departing from the spirit and scope of the appended claims.

I claim as my invention:

1. A selector valve for use in a hydraulic system, comprising a valve body having a substantially smooth, cylindrical bore, a valve member axially slidable within said bore, outlet ports in said body affording connections for pressure and return lines from said valve to a hydraulic cylinder, each outlet port extending from the exterior of said body and intersecting said bore at one side thereof and extending through into the opposite wall thereof, a pressure port communicating with said bore for supplying pressure fluid thereto, and a return port communicating with said bore for discharging fluid therefrom, said valve member comprising a cylindrical member of substantially the same diameter as said bore forming therewith a sliding fit, said valve member being undercut to provide a plurality of axially spaced flanges, forming annular chambers therebetween including a center chamber spanning said pressure port and a pair of return chambers spaced axially therefrom and communicating with said return port, said outlet ports being located along said bore on each side of said pressure port, said flanges including a flange on said valve member adjacent each outlet port to prevent the flow of fluid from said high pressure chamber to either outlet port when the valve is in neutral position, and a flange on said valve member adjacent each outlet port and spaced from said first mentioned flange to afford open communication between the portions of said outlet port on opposite sides of said bore and to permit communication between said portions of said outlet port and the adjacent return chamber when the valve member is in the neutral position and arranged upon axial displacement of said member in one direction to close communication between said outlet port and said chamber before said first mentioned flange moves to a position to pass fluid pressure from said pressure chamber to said outlet port, the other outlet port upon such displacement of said member being maintained in communication with said return chambers.

2. A selector valve for use in a hydraulic system, comprising a valve body having a substantially smooth cylindrical bore, a valve member axially slidable within said bore, outlet ports in said body affording connections for pressure and return lines from said valve to a hydraulic cylinder, each outlet port extending from the exterior of said body and intersecting said bore at one side thereof and extending through into the opposite wall thereof, a pressure port communicating with said bore for supplying pressure fluid thereto, and a return port communicating with said bore for discharging fluid therefrom, said valve member comprising a hollow cylindrical member of substantially the same diameter as said bore forming therewith a sliding fit, said valve member being undercut to provide a plurality of axially spaced flanges forming annular chambers therebetween including a center chamber spanning said pressure port forming a fluid pressure chamber and a pair of return flow chambers spaced axially therefrom, said outlet ports being located along said bore on each side of said pressure port, said return flow chambers being interconnected through said hollow cylindrical member and being in open communication with said return port, said flanges including a flange on said valve member adjacent each outlet port to prevent the flow of fluid from said high pressure chamber to either outlet port when the valve member is in neutral position, and a second flange adjacent each outlet port and spaced from said first mentioned flange to afford open communication between the portions of said outlet port on opposite sides of said bore and between said portions and the adjacent return flow chamber when the valve is neutral and arranged upon axial displacement of said member in one direction to close communication between said portions and said return flow chamber before said first mentioned flange moves to a position to pass fluid pressure from said pressure chamber to said outlet port.

THOMAS C. HILL.

REFERENCES CITED

The following references are of record in the file of this patent:

UNITED STATES PATENTS

| Number | Name | Date |
| --- | --- | --- |
| 651,334 | Baker et al. | June 12, 1900 |
| 1,915,656 | Fiegel | June 27, 1933 |
| 2,243,364 | Trautman | May 27, 1941 |
| 2,261,827 | Brown et al. | Nov. 4, 1941 |
| 2,328,980 | Herman | Sept. 7, 1943 |
| 2,395,671 | Kleinhans | Feb. 26, 1946 |
| 2,403,519 | Gardiner | July 9, 1946 |
| 2,410,869 | Ernst | Nov. 12, 1946 |
| 2,424,901 | Richolt | July 29, 1947 |

FOREIGN PATENTS

| Number | Country | Date |
| --- | --- | --- |
| 5,430 | Great Britain | Mar. 10, 1896 |